Sept. 14, 1937.   P. H. SPRACKLEN   2,092,894
PIVOTAL JOINT FOR ARTIFICIAL LIMBS
Filed Dec. 28, 1934
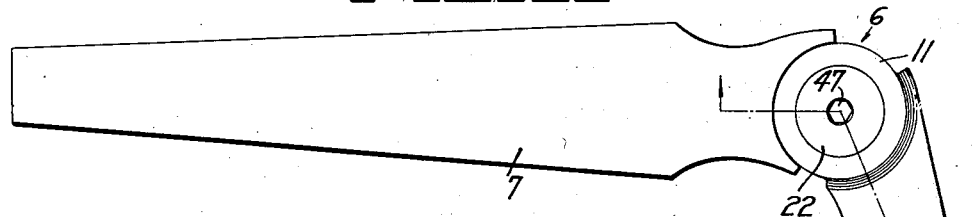
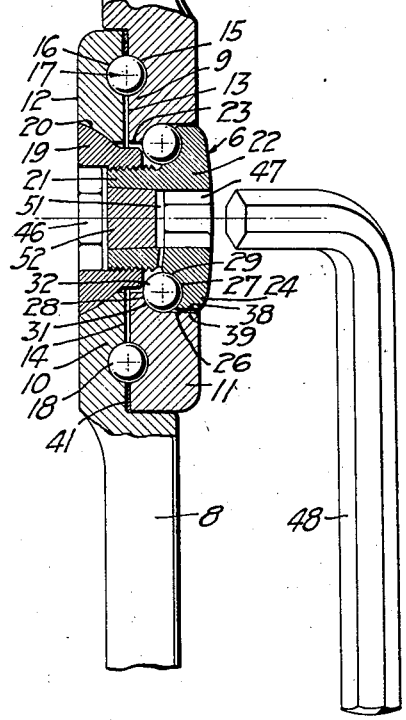
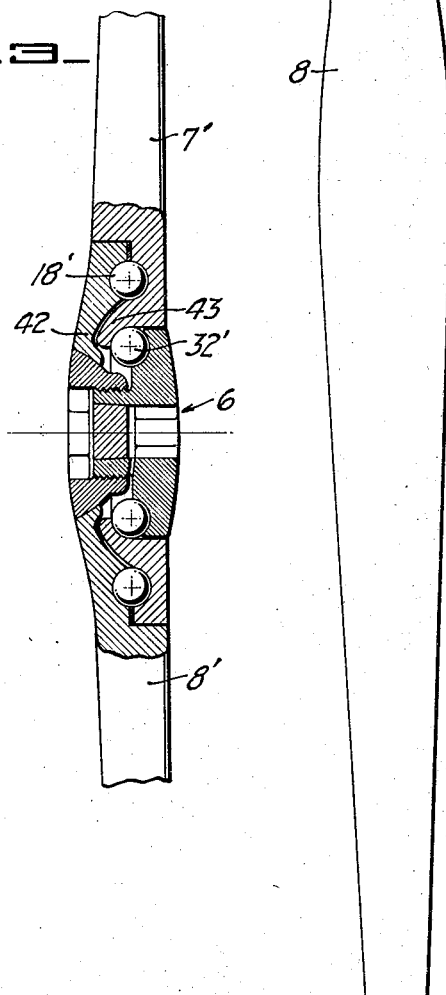
INVENTOR.
Paul H. Spracklen
BY Joseph B. Gardner
ATTORNEY Patented Sept. 14, 1937

2,092,894

UNITED STATES PATENT OFFICE 2,092,894

PIVOTAL JOINT FOR ARTIFICIAL LIMBS

Paul H. Spracklen, Oakland, Calif.

Application December 28, 1934, Serial No. 759,567

9 Claims. (Cl. 287—101)

The invention relates to the construction of joints for pivotally connecting relatively movable sections of artificial limbs.

An object of the invention is to provide a joint of the character described which will afford an increased smoothness and ease of movement between the pivoted sections of an artificial limb.

Another object of the invention is to provide a joint of the character described which will automatically orientate itself to side stress on the joint caused by forces inclined to the axis of the limb sections so as to direct any wear incident to such stress along a transverse axis of the joint where the same may be readily taken up and compensated for, whereby the joint may at all times be maintained against looseness and wobbliness for a substantially unlimited period of use.

A further object of the invention is to provide a joint of the character described in which each of the movable supporting surfaces thereof is engaged by a ball-bearing race in a manner reducing the frictional resistance of the joint to a minimum and in which, notwithstanding the extensive use of the ball races, the joint is constructed in a way confining the thickness thereof to a convenient small size while at the same time affording ample material for carrying the normal stress to which the joint is subjected.

Still another object of the invention is to provide a joint of the above character which will have an improved tightening means which is arranged for precise adjustment of the joint tightness and a firm retention thereof in adjusted position.

The invention possesses other objects and features of advantage, some of which, with the foregoing, will be set forth in the following description of the preferred form of the invention which is illustrated in the drawing accompanying and forming part of the specification. It is to be understood, however, that variations in the showing made by the said drawing and description may be adopted within the scope of the invention as set forth in the claims.

Referring to said drawing:

Figure 1 is a side elevation of a joint constructed in accordance with my invention.

Figure 2 is a sectional view of the joint shown in Figure 1 and taken through the transverse pivot axis of the joint.

Figure 3 is a sectional view similar to Figure 2 of a modified form of the invention.

Referring more particularly to the drawing, the pivotal joint 6 of my invention is provided between a pair of arms 7 and 8 which are in turn arranged for connection to the upper and lower sections of an artificial limb, the joint 6 being adapted for use at the knee or elbow or the like of the artificial limb and being designed to simulate the movement and operation of the corresponding joint members of the human body.

As here shown, the arms 7 and 8 are provided with sunken arcuate end portions 9 and 10 which are nested one within the other for relative rotation about a central axis, the relieved end faces 11 and 12 of the arms adjacent the portions 9 and 10 being so spaced peripherally of the latter as to limit—in the joint here shown—the relative rotation of the arms to an amplitude approximating the limb movement afforded by the knee or elbow of the body. As here provided the opposed surfaces 13 and 14 of the arm portions 9 and 10 are formed with transversely aligned annular recesses 15 and 16 defining together a ball race 17 for ball bearings 18. Means for holding the arms against transverse separation, and for pivotal movement on the ball race, here include a nut 19 seated in an opening 20 in the portion 10 and threadably carried on the stem 21 of a screw 22. The latter as here shown is arranged to engage in an opening 23 in the arm portion 9 and is provided with a head 24 which is seated in a recess 26 formed as an enlargement of the opening 23 at the outer side of the end portion 9. In this manner, pivotal movement of the arms about the screw is permitted with the opposing faces of the arm ends supported for ease of relative displacement on the balls 18. There is, however, a second pair of friction bearing surfaces which are defined by the transversely opposed sides 27 and 28 of the screw head and recess therefor. In accordance with my invention, these surfaces are likewise supported for relative movement on ball bearings, and to this end the sides 27 and 28 are formed with transversely aligned annular recesses 29 and 31 which define a race for balls 32. Thus, as will now be clear, each of the transversely opposed supporting surfaces of the joint are mounted for free relative movement by means of the two sets of ball bearings 18 and 32. So as to entirely eliminate all frictional resistance to movement of the joint except that offered by the two ball bearings, each relatively movable pair of circumferentially opposed surfaces, such as the arm and faces and the relieved arm sides 11 and 12, as well as the peripheral sides 38 and 39 of the screw head and recess therefor, are disposed in slightly spaced and disengaged relation. The minute passages thus defined in the instance between the ends of the inter-engaged arm portions are prevented from admitting dust and other foreign particles to the center of the joint by the interpositioning between the opposed faces 13 and 14 and about the ball race 17 of an annular packing and filtering ring 41.

Notwithstanding the extensive use of the ball bearings as above outlined I have so designed the joint to be of a minimum thickness, which feature as will be understood is of considerable importance in artificial limbs where a minimum bulkiness is desired. As a principal factor in the confining of the joint thickness, the annular ball bearing 32 is spaced circumferentially within the ball bearing 18 so as to permit the approach thereof to the plane of the latter and the minimizing of transverse spacing between the bearings to an amount considerably less than would be possible were the bearings axially aligned. This feature has been carried a step further in the modified form of the invention shown in Figure 3 where by reason of the interengaging recessed and offset portions 42 and 43 on the arms 7' and 8' the two sets of ball bearings 18' and 32' may be disposed in a common transverse plane while still affording ample supporting material on the arms to carry the stress to which the joint may be normally subjected.

As will be clear, in the use of an artificial limb the latter is almost always subjected to stress due to force inclined or diagonal to the length of the limb arms. Accordingly and forming a particularly important feature of the invention, means are provided for directing any wear of the bearings caused by such stress to a uniform deepening of the ball races rather than to an elongation or other deformation thereof. In this way any resulting wear may be directly compensated for without incurring looseness or wobbliness of the joint by simply tightening of the screw 22. In carrying out this feature of my construction, the nut 19 and seat 20 therefor are provided with a spherical interfit thereby imparting to the nut and attached screw a universal mounting on the end portion 9 of the arm 7. Thus on the application of a diagonal force on the limb arms, the nut 19 will tend to rotate sufficiently in its seat to translate the applied diagonal force to an effective transverse one, whereby the strain on the screw 21 and the bearings will be substantially entirely axially of the joint.

Preferably the screw and nut are arranged to facilitate tightening thereof to compensate any wear of the bearing as above described and to this end the nut and screw head are here formed with hexagonal sockets 46 and 47 which are arranged to engage similarly formed wrenches such as the one 48 here shown.

One of the most important requirements of the present construction is the procuring of a precise and firm fit between the threads on the nut and screw, for without such a fit the members could never be held in adjustment and a lock screw or other equally impractical means would need be used. As will be understood, in order that any sort of a fit may be made in any degree permanent, it is necessary to heat treat and harden the screw and nut, and while a reasonably good fit between the threads of these members is not difficult of attainment when the members are in their original and relatively soft state, sufficient expansion and contraction usually occurs in the course of hardening of the members as to spoil the fit first provided. Thus it has been heretofore necessary to either expend considerable time and patience trying to recut or grind the hardened threads or to discard the worst misfits entirely. In the present construction the difficulties encountered in obtaining a reasonable fit after the hardening process have been alleviated and in addition a substantially perfect fit is insured in practically every instance. This is here effected by forming in the screw stem an axial bore 51 which opens to the end face of the stem and in which is fitted and forced to a selective depth a wedge plug 52. Thus while it is extremely difficult to reform the hardened threads from the exterior, it is a relatively simple operation to expand the screw stem by means of the plug to obtain just the correct tightness of fit between the screw and nut threads.

As will be seen from the drawing and particularly from Figures 2 and 3, the bore 51 extends completely through the length of the screw 22 whereby access may be had to the pin 52 from either end of the bore for driving the plug into or out of the screw. In the original setting of the pin to provide a firm threaded engagement of the screw and nut, the present arrangement makes possible the ready adjustment of the pin by driving from either end as required whereby just the right tightness of the threads will be effected. As the actual axial movement of the pin in effecting this final adjustment is slight and if driven but a small distance too far into the screw will lock the nut and screw together, the access to the reduced end of the pin for driving it out slightly in case of a locked engagement of the screw and nut is of utmost importance.

I claim:

1. In a pivotal joint for artificial limbs, a pair of arms mounted adjacent the ends thereof in superimposed relation and formed on their opposing sides with registering annular grooves defining a ball bearing race and having aligned openings at the center of said race, ball bearings in said race, a screw extending through said openings and provided with a head abutting one of said arms, a nut engaging said screw and abutting the other arm, the opposed surfaces of said head and adjacent arm being formed with registering annular grooves defining a ball bearing race, ball bearings in said race, and means on said nut for tightening the same on said screw.

2. In a pivotal joint for artificial limbs, a pair of arms mounted adjacent the ends thereof in superimposed relation and formed on their opposing sides with registering annular grooves defining a ball bearing race and having aligned openings at the center of said race, ball bearings in said race, a dust filtering ring mounted between said sides and surrounding said race, a screw extending through said openings and provided with a head abutting one of said arms, a nut engaging said screw and abutting the other arm, the opposed surfaces of said head and adjacent arm being formed with registering annular grooves defining a ball bearing race, ball bearings in said race, said nut having a wrench engaging portion for tightening the same on said screw.

3. In a pivotal joint for artificial limbs, a pair of arms mounted adjacent the ends thereof in superimposed relation and formed on their opposing sides with registering annular grooves defining a ball bearing race and having aligned openings at the center of said race, ball bearings in said race, a screw extending through said openings and provided with a head abutting one of said arms, a nut engaging said screw and abutting the other arm and provided with a wrench receiving portion for tightening the same on said screw, the opposed surfaces of said head and adjacent arm being formed with registering annular grooves defining a ball bearing race, and ball bearings in said race, one of said races being circumferentially smaller and disposed radially within the other of said races.

4. In a pivotal joint for artificial limbs, a pair of arms mounted adjacent the ends thereof in superimposed relation and formed on their opposing sides with registering annular grooves defining a ball bearing race and having aligned openings at the center of said race, ball bearings in said race, a screw extending through said openings and provided with a head abutting one of said arms, a nut engaging said screw and abutting the other arm and formed with a wrench socket for tightening the same on said screw, the opposed surfaces of said head and adjacent arm being formed with registering annular grooves defining a ball bearing race, and ball bearings in said race, one of said races being circumferentially smaller and disposed radially within and in substantially a common plain with the other of said races.

5. In a pivotal joint for artificial limbs, a pair of limb arms, means of pivotal connection for said arms comprising, a screw extending through said arms defining a pivotal axis and provided with a head abutting against one of said arms, annular ball races and ball bearings therein surrounding said screw between said arms and between said head and abutting arm for supporting the arms for pivotal movement, and a spherical nut engaging in a spherical seat in the other of said arms and connected to said screw for holding the arms against transverse separation and for translating forces on said arms inclined to the length thereof to transverse forces applied to said bearings.

6. In a pivotal joint for artificial limbs, a pair of limb arms mounted with the ends thereof in opposed relation and provided with aligned openings and formed at the outer sides thereof and about said openings with an enlarged cylindrical recess and a spherical seat respectively, a ball race and ball bearings therefor mounted between for supporting the opposed sides of said arms, a screw mounted in said openings and provided with a head disposed in said recess, a ball race and ball bearings therefor rotatably supporting said screw head in said recess, a spherical sided nut universally mounted in said seat and engaging said screw for holding the arms against transverse separation and for translating forces inclined to the length of said arms to transverse forces applied to said bearings, said screw being provided with an axial bore opening to an end thereof, and a wedge plug mounted in said bore for expanding said screw into secure engagement with said nut.

7. In a pivotal joint for artificial limbs having a pair of limb arms and bearing means connecting said arms affording pivotal movement therebetween and a screw for tightening the connection of said arms and bearing means, the provision of a circular tapered axial bore extending through said screw, and a circular tapered pin adapted for driving into said bore for uniformly expanding said screw to effect a tight fitting adjustable engagement thereof.

8. In a pivotal joint for artificial limbs having a pair of limb arms and means including a screw and cooperating threads connecting said arms affording pivotal movement therebetween, the provision of a longitudinal bore extending completely through the length of said screw, and a circular tapered pin adapted for driving into said bore and for longitudinal adjustment in said bore from either end of said screw for expanding the latter to effect a tight fitting adjustable engagement thereof with said cooperating threads.

9. In a pivotal joint for artificial limbs having a pair of limb arms and bearing means affording pivotal movement therebetween and means including a screw and cooperating threads for connecting said arms and bearing means, the provision of a longitudinal bore extending completely through the length of said screw and having a circular tapered portion, the annular wall of said screw defining said bore at said tapered portion being solid, and a circular tapered pin adapted for driving into said bore for longitudinal adjustment in said bore from either end of said screw for uniformly expanding the latter, to effect a tight fitting adjustable engagement thereof with said cooperating threads.

PAUL H. SPRACKLEN.